United States Patent [19]

Mallouk et al.

[11] Patent Number: 4,912,072
[45] Date of Patent: Mar. 27, 1990

[54] METHOD FOR SELECTIVE INTERNAL PLATINIZATION OF POROUS ALUMINOSILICATES

[75] Inventors: Thomas E. Mallouk, Austin, Tex.; Lalchan Persaud, Markham, Canada

[73] Assignee: Gas Research Institute, Chicago, Ill.

[21] Appl. No.: 260,931

[22] Filed: Oct. 21, 1988

[51] Int. Cl.$^4$ .................... B01J 29/12; B01J 29/22; B01J 29/32
[52] U.S. Cl. ......................................... 502/74; 502/66
[58] Field of Search ............................ 502/74, 66, 171

[56] References Cited

U.S. PATENT DOCUMENTS

| | | | |
|---|---|---|---|
| 3,013,987 | 12/1961 | Castor et al. | 502/74 |
| 3,200,083 | 8/1965 | Milton | 502/74 |
| 3,226,339 | 12/1965 | Frilette et al. | 502/74 |
| 3,236,762 | 2/1966 | Rabo et al. | 502/74 |
| 3,267,076 | 8/1966 | Ishii et al. | 502/171 |
| 3,314,895 | 4/1967 | Munns, Jr. | 502/74 |
| 3,862,994 | 1/1975 | Yates | 502/171 |
| 4,547,472 | 10/1985 | Nordstrant et al. | 502/66 |
| 4,595,668 | 6/1986 | Poppelmeier et al. | 502/66 |

OTHER PUBLICATIONS

Zeolite Chemistry and Catalysis by Rabo, ACS Monograph 171, Washington, D.C., 1976 (Minachev et al–Metal–Zeolite Catalysts, pp. 555–559 & 562–565.
Felthouse et al., Zeolite–Encapsulated Platinum Catalysts: Preparation, Characterization by Transmission Electron Microscopy and Their Shape Selective Behavior Toward Various Nitrogen Base Poisons During the Catalytic Oxidation of Aqueous Formaldehyde, Journal of Catalysts, vol. 98, 1983, 411–433.
Persaud et al., Photochemical Hydrogen Evolution via Singlet–State Electron–Transfer Quenching of Zinc Tetra (N–methyl–4–pyridyl) Porphyrin Cations in a Zeolite L Based System, Journal of the American Cancer Society, vol. 109, No. 24, 1987, pp. 7309–7314.

Primary Examiner—Carl F. Dees
Attorney, Agent, or Firm—Arnold, White & Durkee

[57] ABSTRACT

The present invention involves processes for producing zeolite catalyst with an exclusively internal surface platinum coating. In one embodiment, the process of the present invention comprises initially equilibrating zeolite (preferably in powder form) with an organic solution (e.g., dichloromethane) of a neutral organo-platinum compound preferably platinum acetylacetonate. The equilibrated zeolite is then washed to remove externally associated organo-platinum compound. In the preferred procedure here, the solvent is then removed from the washed zeolite. Next, organo-platinum compound contained in the washed zeolite is decomposed, preferably by heating to between about 200° C. and about 300° C. Finally, internally-contained decomposed organo-platinum compound is reduced, preferably by hydrogenolysis, to produce zeolite with an exclusively internal surface platinum coating.

Another process for producing internally platinized zeolite catalyst is also part of the present invention. This process comprises initially incubating an aqueous mixture comprising a cationic platinum complex and zeolite powder. A preferred cationic platinum complex is cis-diaquodiammine platinum, although others of analogous structure and properties should be functional. Following separation of the incubated zeolite from the mixture, the zeolite is reacted with a tetraalkylammonium or tetraalkylphosphonium salt. The tetraalkylammonium or tetraalkylphosphonium salt is preferably a halide salt, most preferably tetrabutylammonium bromide. After removing unreacted tetraalkylammonium or tetraalkylphosphonium salt from the zeolite, residual cationic platinum complex in the zeolite is decomposed, preferably by photolysis. Internally contained decomposed platinum complex is then reduced, to produce zeolite with an exclusively internal surface platinum coating.

18 Claims, 1 Drawing Sheet

METHOD FOR SELECTIVE INTERNAL PLATINIZATION OF POROUS ALUMINOSILICATES

BACKGROUND OF THE INVENTION

The present invention relates to the selective internal platinization for porous aluminosilicates.

Natural and synthetic aluminosilicates are of practical importance as molecular sieves and catalysts. Synthetic zeolites modified with nonframework metals are among those materials that have been intensively studied with regard to cation-exchange properties, metal ion localization, and catalysis.[1-3] Transition metal ion exchanged zeolites have been found to be particularly efficient for various catalytic reactions. For example, oxidation of propylene by cupric ion exchanged zeolite Y,[4] cyclodimerization of butadiene,[5] and the catalytic oxidation of ethylene by $Pd^{2+}/Cu^{2+}$ metal ions of zeolite Y[6] have been described. Platinized zeolite L has been used in nonacidic catalytic re-forming and dehydro-cyclization reactions.[7] Much of this chemistry has focused on creating encapsulated transition-metal catalysts. The principal role of the zeolite framework is to provide a compartmentalized environment, the metal being immobilized within the microporous structure. Molecules that poison the catalyst, if they are sufficiently large, may be size-excluded from the zeolite pore structure.[8] With smaller pore zeolites such as ZSM-5 and ZSM-11, reactant or product selectivity in a metal-catalyzed reaction is achieved by forcing the reactant molecule to pass through the intracrystalline volume in order to contact the metal. Good selectivity is usually obtained by poisoning the metal sites on the external surface with bulky ligands that are too large to access the internal metal sites.[9-11] Intrazeolite reactions are of course highly desirable in shape-selective catalysis since such selectivity may exceed that possible with liquid-phase catalysts.[12]

Some of the charge-balancing counterions of the anionic zeolite framework are readily exchangeable, and the usual route is to introduce metals by equilibration of cationic metal complexes or metal ions with a suspension of the zeolite. Thus Pt and Pd are easily loaded into the large-pore zeolites Y and L by exchanging $Na^+$ or $NH_4^+$ ions with $Pt(NH_3)_4^{2+}$ or $Pd(NH_3)_4^{2+}$.[8,13] Different loadings of noble metal are readily obtained by this ion-exchange method. Transmission electron microscopy and gas adsorption measurements have shown [8,13] that the bulk of the metal deposited is highly dispersed and lies within the zeolite pore structure. In one embodiment, the present invention involves preparation, using a neutral platinum complex, of zeolite L powders that contain platinum metal exclusively on their internal or inner surfaces. Two sensitive chemical tests are described herein that can differentiate between zeolites platinized both inside and outside and those platinized only on the inside. This is the first time that chemical tests have established the absence of metal clusters or particles on the outer surfaces of a metalated zeolite. These platinized zeolite L powders are part of an integrated system for light-driven vectorial electron transport and hydrogen evolution.[14]

SUMMARY OF THE INVENTION

The present invention involves processes for producing porous aluminosilicate catalysts with an exclusively internal surface platinum coating. In one embodiment, the process of the present invention comprises initially equilibrating porous aluminosilicate (preferably in powder form) with an organic solution (e.g., dichloromethane) of a neutral organo-platinum compound. A preferred neutral organo-platinum compound is platinum acetylacetonate although many other organo-platinum compounds should be usable under the conditions described herein. The equilibrated porous aluminosilicate is then washed to remove externally associated organo-platinum compound. In the most preferred procedure here, the solvent is then removed from the washed porous aluminosilicate. Next, organo-platinum compound contained in the washed porous aluminosilicate is decomposed, preferably by heating to between about 200° C. and about 300° C. Finally, internally-contained decomposed organo-platinum compound is reduced, preferably by hydrogenolysis with molecular hydrogen or sodium borohydride, to produce porous aluminosilicate with an exclusively internal surface platinum coating. This process resulted in a porous aluminosilicate with an exclusively internal platinum coating and which was between about 0.002 and about 0.006 weight percent platinum.

A more preferred process for producing internally platinized porous aluminosilicate catalyst is also part of the present invention. This more preferred process comprises initially incubating an aqueous mixture comprising a cationic platinum complex and porous aluminosilicate powder. A preferred cationic platinum complex is cis-diaquodiammine platinum, although others of analogous structure and properties should be functional in a likewise manner. Following separation of the incubated porous aluminosilicate powder from the mixture, the porous aluminosilicate is reacted with a tetraalkylammonium or tetraalkylphosphonium salt. The tetraalkylammonium or tetraalkylphosphonium salt is preferably a halide salt particularly a bromide, chloride or iodide. A most preferred tetraalkylammonium or tetraalkylphosphonium salt is tetrabutylammonium bromide. After then removing unreacted tetraalkylammonium or tetraalkylphosphonium salt from the porous aluminosilicate, residual cationic platinum complex in the porous aluminosilicate is decomposed, preferably by photolysis (e.g., exposure to visible or ultraviolet light). Internally contained decomposed platinum complex is then reduced, preferably by treatment with hydrogen or sodium borohydride to produce porous aluminosilicate with an exclusively internal surface platinum coating. This process has been found to produce a porous aluminosilicate with an exclusively internal platinum coating and which was between about 0.1 and about 0.5 weight percent platinum.

The porous aluminosilicate of the present invention is preferably a zeolite. Particularly preferred porous aluminosilicates are type L zeolite, mordenite, beta zeolite, ZSM-5 zeolite or ZSM-11 zeolite.

DESCRIPTION OF THE PREFERRED EMBODIMENTS

Figure 1:
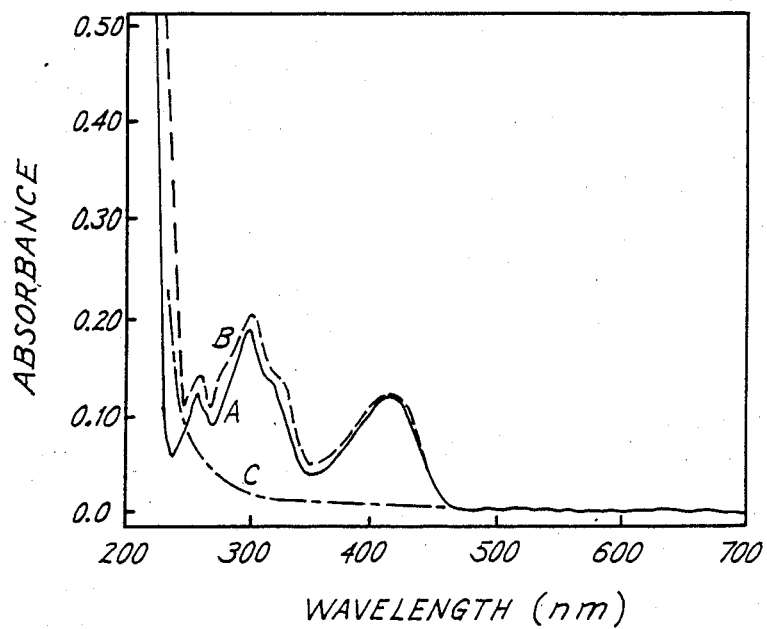
FIG. 1 shows UV-visible spectra: (a) $1 \times 10^{-4}$M aqueous $K_3Fe(CN)_6$ solution; (B) the same solution after suspension of 10 mg/mL of zeolite $L/Pt^0$ prepared from $Pt(acac)_2$,6-h hydrogen purge, and centrifugation; (C) same as (B), but zeolite $L/Pt^0$ prepared from $Pt(NH_3)_4^{2+}$. The loading of $Pt^0$ in (B) and (C) is $1 \times 10^{-4}$ mmol/g.

Methods for the selective internal platinization of porous aluminosilicates have been previously unavailable. In one aspect process of the present invention involves the initial equilibration of a porous aluminosilicate powder with an organic solution of a neutral organo-platinum compound. In the embodiment of the present invention the neutral organo-compound is preferably platinum acetylacetonate, although other neutral organo-platinum compounds should work equally well if properly sized. Externally associated organo-platinum compound is then removed from the equilibrated porous aluminosilicate. The solvent itself is then removed by appropriate washing. Organo-platinum compound contained in the washed aluminosilicate is then decomposed thermally or by photolysis. The decomposed organo-platinum compound is the subjected to reduction, for example, by direct or indirect hydrogenolysis.

In another embodiment the initial step of the present invention involves incubating an aqueous miture of the cationic platinum complex and a porous aluminosilicate powder. After separation from the aqueous mixture, the porous aluminosilicate is reacted with a tetraalkylammonium or tetraalkylphosphonium salt. After this reaction, the unreacted salt is removed and residual cationic platinum complex decomposed, for example by photolysis or heat. A final step involves the reduction of internally contained platinum complex to produce a porous aluminosilicate within exclusively internal surface platinum coating. The preferred decomposition steps in either of the preferred embodiments may involve the application of sufficient heat (for example to between about 200° C. and about 300° C.) or photolysis by exposure to visible or ultraviolet light. The preferred aluminosilicate of the present invention is a zeolite. The zeolite may be of the type L variety, mordenite, beta zeolite, ZSM-5 zeolite or ZSM-11 zeolite, for example. When a neutral organo-platinum complex is utilized, the organic solution thereof, preferably involves a solvent such as dichloromethane. When a cationic platinum complex is utilized in the most preferred embodiment of the present invention, said complex is preferably cis-diaquodiammine platinum, although analogous cationic platinum complexes should work as well.

While particularly preferred embodiments of the present invention are described subsequently herein, it is understood that many variations may be made, in particular, compounds, complexes, porous aluminosilicates, solvents and methods without significantly deviating from the unique concepts of the present invention.

The following examples are presented to describe certain specific embodiments and advantages of the present invention and are not meant to limit the present invention unless specifically so described in the claims appended hereto.

EXAMPLE 1

Materials

Zeolite L (ideal formula $K_6Na_3Al_9Si_{27}O_{72} \cdot 21H_2O$) and zeolite Y ($Na_{56}Al_{56}Si_{136}O_{384} \cdot 250H_2O$) powders were obtained from Union Carbide, Linde Division. Scanning electron microscopy showed that the average particle size was in both cases about 1 um (micrometer). Tetraammineplatinum(II) chloride and platinum acetylacetonate ($Pt(acac)_2$) were obtained from Strem Chemicals. Methylviologen iodide was prepared by allowing 4,4'-bipyridine to react with excess methyl iodide in acetonitrile, and this compound was converted to the chloride salt hydrate by ion exchange on a Dowex column. This salt was recrystallized from ethanol/water. All other chemicals were reagent grade and were used as received unless otherwise noted.

Platinization of Zeolites L and Y. Similar procedures were followed for both zeolite types. For platinization using $Pt(NH_3)_4^{2+}$, the zeolite (7 g) was washed with 800 mL of deionized water (from a Barnstead Nanopure II system, resistivity 18.3 Megohm-cm) and dried at 100° C. in air for 2 days. The zeolite powder was then dispersed by sonication in 1 L of water, and 0.000 10–0.24 g of $Pt(NH_3)_4Cl_2H_2O$ dissolved in 100 mL of water was added dropwise. Stirring of the suspension was continued for 6 h, and the powder was filtered. The sample was repeatedly resuspended in water, centrifuged, and separated from the supernatant until the latter was free of the $Pt(NH_3)_4^{2+}$ UV absorbance at 290 nm (nanometer). Two methods of reduction of $Pt(NH_3)_4^{2+}$ to $Pt^0$ were then used. In the first method, the zeolite was carefully dehydrated and reduced with hydrogen; the hydrogen reduction step was carried out at 300° C.[8] In the second method, the $Pt(NH_3)_4^{2+}$-exchanged zeolite powder (7 g) was dried under flowing nitrogen at 40° C. for 16 h, suspended in 700 mL of $H_2O$, and reduced by dropwise addition of 500 mL of 0.1M aqueous $NaBH_4$. After 8 h, the platinized zeolite was filtered, washed with copious amounts of water, and dried under flowing nitrogen at 40° C. Samples prepared with higher levels of Pt loading (0.10 mmol/g of zeolite) were light gray; those prepared by smaller amounts of $Pt-(NH_3)_4^{2+}$ (0.02 mmol/g of zeolite or less) remained completely white.

Platinization of zeolites Y and L with $Pt(acac)_2$ (platinum acetylacetonate) was carried out in a similar fashion; because this complex is insoluble in water, dichloromethane (Fisher, Spectrograde) was used in the loading and subsequent resuspension/centrifugation steps. The zeolite powder (10 g, dried in air at 100° C. for 2 days) was stirred for 4 days with 0.5 g of $Pt(acac)_2$ dissolved in 200 mL of dichloromethane. The powder was separated from the supernatant solution by centrifugation and was resuspended in 75 mL of dichloromethane. The last steps were then repeated (10–15 washings were typically required) until the complex was not detectable ($A_{220\ um} < 0.02$) in the supernatant by UV-visible spectroscopy. The zeolite powder was dried overnight at 40° C. under flowing nitrogen and then heated in air at 225°–250° C. for 4 h. After it was cooled to room temperature, the platinized zeolite was reduced with aqueous $NaBH_4$ solution and washed as described above for $Pt(HN_3)_4^{2+}$-exchanged zeolites.

The amount of $Pt^0$ deposited inside the zeolite framework, with $Pt(acac)_2$ as the source of platinum, is very small. Elemental analysis (Galbraith Laboratories) on hydrated samples established that the loading level in zeolites Y and L is typically in the range $(1.0–3.0) \times 10^{-4}$ mmol of Pt/g; with $Pt(NH_3)_4^{2+}$ as the platinum source, the loading is continuously variable from $5.0 \times 10^{-5}$ to $1.0 \times 10^{-1}$ mmol of Pt/g. For the highest loading level, the Pt(111) line is discernible in X-ray powder diffraction patterns, but for samples with less than $2 \times 10^{-2}$ mmol of Pt/g, the platinum is not detectable by X-ray diffraction, Auger spectroscopy, or X-ray photoelectron spectroscopy. Chemical methods were therefore used to verify the presence of $Pt^0$ and to determine its distribution in/on the zeolite particles.

In the presence of $H_2$ and $Pt^0$, methylviologen ($MV^{2+}$) is reduced to the cation radical at pH>7:

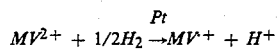

$$MV^{2+} + 1/2H_2 \xrightarrow{Pt} MV^{\cdot+} + H^+$$

The dicationic $MV^{2+}$ exchanges into zeolites L or Y[14,15] to a maximum loading of ca. 1 $MV^{2+}$ per large cavity (1 per unit cell in L, 8 per unit cell in Y). The excess remains in the solution phase. Because the rate of exchange between zeolite-bound and solution-phase methylviologen molecules in relatively slow, and because the formal potential of the $MV^{2+/1+}$ couple is slightly more positive inside the zeolite than in the solution,[14c] zeolites that are platinized only on the inside do not catalyze the rapid reduction of solution-phase $MV^{2+}$. When $Pt^0$ zeolite L prepared from Pt(acac)$_2$ was equilibrated with $MV^{2+}$, and hydrogen was then bubbled through the suspension, only the zeolite particles turned blue. The color change typically took 30–60 s in 10 mM $MV^{2+}$/1 mM NaHCO$_3$ aqueous solution. The solution phase remained colorless. The blue coloration is characteristic of reduced viologen radicals, $MV^{\cdot+}$. When zeolite L in which platinum was deposited both internally and externally (prepared from $Pt(NH_3)_4^{2+}$) was treated in the same manner, both particles and solution rapidly turned blue. In the later case, the viologen in the aqueous phase readily contacts the platinum on the outer surface and is reduced. Zeolite Y platinized with either reagent gives blue solutions, even at the lowest level of loading (5.0×10$^{-5}$ mmol of Pt/g), indicating $Pt^0$ both inside and outside. This redox test not only establishes the presence of $Pt^0$ but also differentiates between zeolites with platinum inside the cavities and those with platinum both inside the zeolite and on the external surface.

The absence of $Pt^0$ on the external surface of zeolite L was verified by an additional chemical test. Ferricyanide, $Fe(CN)_6^{3-}$, a trianionic species, does not enter the anionic framework of zeolites L and Y. This was established from UV-visible difference spectra of ferricyanide solutions equilibrated with the two zeolites. The ferricyanide ion undergoes a rapid reduction to $Fe(CN)_6^{4-}$ in the presence of platinum and $H_2$ in aqueous solution. Platinum deposited exclusively within the zeolite L framework cannot make contact with ferricyanide when the particles are suspended in a 1×10$^{-4}$M $Fe(CN)_6^{3-}$ solution. UV-visible spectra of these solutions are identical before and after purging for 6 h with hydrogen (FIG. 1). For zeolite L containing platinum on both the inner and external surfaces ($Pt^0$-/L prepared from $Pt(NH_3)_4^{2+}$), the identical treatment results in complete disappearance of the absorbance maxima at 302 and 418 nm attributable to the ferricyanide ion (FIG. 1). Again, zeolite Y platinized by either method and reduced with either hydrogen or aqueous NaBH$_4$ shows evidence for $Pt^0$ on the outer surfaces, as it catalyzes the $Fe(CN)_6^{3-}$ reduction. The ferricyanide test is preferred for zeolite Y, since diffusion of $MV^{\cdot+}$ out of zeolite Y is known to be fast,[15] and false positive tests for external Pt might be obtained by using the $MV^{2+}$ test.

In order to determine the sensitivity of the ferricyanide test, we prepared nonporous SiO$_2$ powder (made by grinding quartz glass to an average particle size of 6 um) impregnated with Pt(acac)$_2$ dried, and reduced as above for zeolites Y and L. With SiO$_2$ as the support, $Fe(CN)_6^{3-}$ reduction was observable in 12 h with platinum loadings of (3–5)×10$^{-7}$ mmol of Pt/g but not with loadings 1 order of magnitude lower. This result suggests (assuming similar degrees of Pt dispersion on the external surface of zeolite L and SiO$_2$) that zeolite L platinized with Pt(acac)$_2$ has less than 0.1% of its platinum on the external surface.

We have described a new method for depositing platinum exclusively on the inner surfaces of zeolite L particles. The same selectivity is not observed for zeolite Y, even though the crystallographic channel diameters in Y and L (7.4 and 7.1 Å, respectively) are quite similar.[16] The difference between zeolites Y and L, with regard to platinization of the external surface, can probably be attributed to the connectivity of the large cages in the two structures. In the zeolite Y structure, each supercage has four nearest neighbors and molecular diffusion can occur freely in three dimensions. in zeolite L, however, the large cavities are linearly interconnected to from one-dimensional tunnels; diffusion of large molecules such as Pt(acac)$_2$ is likely to be severely restricted. Hence it is possible with the L structure to wash the complex completely off the external surface and to dry the zeolite before substantial diffusion out of the bulk and onto the external surface can occur. The chemical tests outlined above are inexpensive and sensitive and may be of general utility in locating noble-metal catalysts in/on zeolites.

EXAMPLE 2

Another embodiment of the present invention has been successfully applied both to zeolite L and mordenite. A typical preparation involved the synthesis of the known dicationic complex, cis-diaquodiammine platinum [$Pt(H_2O)_2(NH_3)_2^{2+}$], in aqueous solution. Five to 10 ml (approximately 30 mg./10 ml.) of this solution was added to a suspension of the appropriate zeolite powder (3–4 g. in 100–500 ml. water). The suspension was stirred for 1–15 hours and filtered. The zeolite was then suspended in water (100–200 ml.) to which 100–200 mg. tetrabutylammonium bromide had been added, stirred for 15 min. to 2 hrs., and filtered again. This last suspension/ion exchange/filtration step was usually repeated once or twice. The filtered zeolite is then suspended in water and photolyzed with broad-band visible/ultraviolet light for 1–6 hrs. At the end of this time hydrogen gas was passed through the suspension for 1–2 hrs and the product collected by filtration. All these steps were carried out at room temperature. The assay for catalytically active platinum and its selectivity for the internal zeolite surface followed the procedure described in Example 1 (i.e., the colorimetric methylviologen/hydrogen and ferricyanide/hydrogen tests). Assuming that all the platinum added in the first step remained in the zeolite, the final product was 0.1–0.5% platinum by weight. The selectivity for the internal surface is as good (from the result of the ferricyanide/hydrogen test) as with our previous method, which gave only about 0.004% platinum by weight. Although the mechanisms of these reactions are incompletely defined, the following possible scheme may facilitate understanding and is not meant to limit this invention. The cationic platinum complex exchanges for mobile sodium ions within the zeolite pores and on its external surface. The second ion exchange with tetrabutylammonium cations, which are too large to enter the internal pore structure, removes the platinum-containing cations from the external surface. To ensure that the removal is complete, this step is usually done twice. It is likely that any size-excluded cations would suffice for this step, so the reagent is not necessarily tetrabutylammonium bromide—any tetraalkylammonium or tetraalkylphosphonium salt, for example, should work. The encapsulated platinum complex is then decomposed by ultraviolet light, probably forming hydrated $Pt^{2+}$ ions inside the zeolite. UV-visible spectra taken of the zeolite at this point show that the $Pt(H_2O)_2(NH_3)_2^{2+}$ ions have been decomposed (see FIG. 1). The platinum cations which remain are rather unstable and are susceptible to reduction by hydrogen at room temperature. The fact that the temperature is kept low is important, because diffusion of platinum from the internal to external sites is inhibited, giving the observed excellent selectivity for the internal sites. To my knowledge all other preparations for platinized zeolites, including our previous method, involve at least one higher temperature step.

While we have demonstrated the effectiveness of this method for only two zeolite types (L and mordenite), it is likely that it will be useful for other catalytically important zeolites. These include zeolites beta, ZSM-5 and ZSM-11, which have pore sizes comparable to or smaller than zeolite L. We have applied this procedure to zeolite Y, which has slightly larger pores than zeolite L, but do not observe the same high selectivity for the internal sites.

The references in the following list are incorporated by reference herein for the reasons previously cited.

[1] Sherry, H. S. *Adv. Chem. Ser.* 1971, No. 101, 350.
[2] Smith, J. V. *Adv. Chem. Ser.* 1971, No. 101, 171.
[3] Naccache, C.; Taarit, Y. B. *Pure appl. Chem.* 1980, 52, 2175.
[4] Mochida, L.; Mayota, S.; Kato, A. *J. Catal.* 1970, 19, 405.
[5] Maxwell, I. E.; Downing, R. S.; Von Laugher, S. A. *J. Catal.* 1980, 61, 485.
[6] Arai, H.; Yamashiro, T.; Kobo, T.; Tominaga, H. *Bull. Jpn. Pet. Inst.* 1976, 18, 39.
[7] (a) Bernard, J. *Proc. Int. Conf. Zeolites* 1980, 5, 686. (b) Tauster, S. J.; Steger, J. J.; Fung, S. C.; Poeppelmeier, K. R.; Funk, W. G.; Montagna, A. A.; Cross, V. R.; Kao, J. L. U.S. Pat. No. 4595668. (c) Van Nordstrand, R. A. U.S. Pat. No. 4547472.
[8] Felthouse, T. R.; Murphy, J. A. *J. Catal.* 1986, 98, 411.
[9] (a) Huang, T. N.; Schwartz, J. *J. Am. Cham. Soc.* 1982, 104, 5245. (b) Huang, T. N.; Schwartz, J.; Kitajima, N. *J. Mol. Catal.* 1984, 22, 389.
[10] Corbin, D. R.; Seidel, W. C.; Abrams, L.; Herron, N.; Stucky, G. D.; Tolman, C. A. *Inorg. Chem.* 1985, 24, 1800.
[11] Sohn., J. R.; Lunsford, J. H. *J. Mol. Catal.* 1985, 32, 325.
[12] Dessau, R. M. *J. Catal.* 1982, 77, 304.
[13] (a) Bergeret, G.; Gallezot, P.; Imelik, B. *J. Phys. Chem.* 1981, 85, 411. (b) Gallezot, P. *Catal. Rev. Sci. Eng.* 1979, 20, 121. (c) Saha, N. C.; Wolf, E. E. *Appl. Catal.* 1984, 13, 107. (d) Dekewicz, R. P.; Weiss, A. H.; Kranich, W. L. *J. Wash. Acad. Sci.* 1984, 74, 19. (e) Boudart, M.; Meitzner, G. *Springer Proc. Phys.* 1984, 2, 217. (f) Dalla Betta, R. A.; Boudart, M. *Catalysis;* North-Holland: Amsterdam, 1973; Vol. 1, p. 1329.
[14] Li, Z.; Mallouk, T. E. *J. Phys. Chem.* 1987, 91, 643. (b) Persaud, L.; Bard, A. J.; Campion, A.; Fox, M. A.; Mallouk, T. E.; Webber, S. E.; White, J. M. *J. Am. Chem. Soc.*, in press. (c) Li, Z.; Mallouk, T. E.; Persaud, L., submitted for publication.
[15] Gemborys, H. A.; Shaw, B. R. *J. Electroanal. Chem. Interfacial Electrochem.* 1986, 208, 95.

Changes may be made in the components, elements and assemblies described herein without departing from the concept and scope of the invention as defined in the following claims.

What is claimed is:

1. A process for producing linearly channeled zeolite catalyst with an exclusively internal surface platinum coating, the process comprising:
   equilibrating linearly channeled zeolite with an organic solution of a neutral organo-platinum compound;
   washing said equilibrated linearly channeled zeolite to remove externally associated organo-platinum compound;
   removing solvent from the washed linearly channeled zeolite; and
   reducing internally-contained organo-platinum compound to produce linearly channeled zeolite with an exclusively internal surface platinum coating.

2. A process for producing internally platinized zeolite catalyst, the process comprising:
   incubating an aqueous mixture comprising a cationic platinum complex and zeolite powder;
   separating the incubated zeolite powder from the mixture;
   reacting the zeolite with a tetraalkylammonium or tetraalkylphosphonium salt;
   removing unreacted tetraalkylammonium or tetraalkylphosphonium salt from the zeolite;
   decomposing, through photolysis, residual cationic decomposed platinum complex to produce zeolite with an exclusively internal surface platinum coating.

3. The process of claim 2 wherein the photolysis involves exposure to visible or ultraviolet light.

4. The process of claim 1 wherein the decomposing step involves heating the zeolite to between about 200° C. and about 300° C.

5. The process of claim 1 wherein the neutral organo-platinum compound is platinum acetylacetonate.

6. The process of claim 2 wherein the zeolite is a linearly channeled zeolite.

7. The process of claim 1 or 2 wherein the zeolite is mordenite.

8. The process of claim 1 or 2 wherein the zeolite is type L zeolite.

9. The process of claim 1 or 2 wherein the zeolite is beta zeolite, ZSM-5 zeolite, ZSM-11 zeolite, or mordenite.

10. The process of claim 1 or 2 wherein the reducing step involves hydrogenation.

11. The process of claim 1 or 2 wherein the reducing step involves sodium borohydride.

12. The process of claim 1 wherein the organic solution comprises dichloromethane.

13. The process of claim 1 wherein the zeolite with an exclusively internal platinum coating is between about 0.002 and about 0.006 weight percent platinum.

14. The process of claim 2 wherein the zeolite with an exclusively internal platinum coating is between about 0.1 and about 0.5 weight percent platinum.

15. The process of claim 2 wherein the cationic platinum complex is cis-diaquodiammine platinum.

16. The process of claim 2 wherein the salt is a halide salt.

17. The process of claim 15 wherein the halide is bromide.

18. The process of claim 2 wherein the tetraalkylammonium or tetraalkylphosphonium salt is tetrabutylammonium bromide.

* * * * *

UNITED STATES PATENT AND TRADEMARK OFFICE
CERTIFICATE OF CORRECTION

PATENT NO. : 4,912,072

DATED : March 27, 1990

INVENTOR(S) : Thomas E. Mallouk, and Lalchan Persaud

It is certified that error appears in the above-identified patent and that said Letters Patent is hereby corrected as shown below:

In claim 1, column 8, line 23, delete the word "and".

In claim 1, column 8, immediately after line 23, insert the following step: --decomposing internally-contained organo-platinum compound in the washed linearly channeled zeolite; and--.

In claim 1, column 8, line 24, between the words 'contained' and 'organo' insert the word --decomposed--.

In claim 2, column 8, line 38, delete the word "decomposed" and delete the phrase "to produce zeolite".

In claim 2, column 8, lines 39 and 40, delete the phrase "with an exclusively internal surface platinum coating.", and add the term --; and--.

In claim 2, column 8, immediately after line 40, insert the following step: --reducing internally-contained decomposed platinum complex to produce zeolite with an exclusively internal surface platinum coating.--

UNITED STATES PATENT AND TRADEMARK OFFICE
CERTIFICATE OF CORRECTION

PATENT NO. : 4,912,072

DATED : March 27, 1990

INVENTOR(S) : Thomas E. Mallouk, and Lalchan Persaud

It is certified that error appears in the above-identified patent and that said Letters Patent is hereby corrected as shown below:

In claim 17, column 10, line 1, delete the number "15", and substitute the number --16-- therefor.

Signed and Sealed this

Twelfth Day of November, 1991

Attest:

HARRY F. MANBECK, JR.

*Attesting Officer*      *Commissioner of Patents and Trademarks*